United States Patent
Kim et al.

(10) Patent No.: US 9,357,209 B2
(45) Date of Patent: May 31, 2016

(54) LUMINANCE CORRECTION SYSTEM AND METHOD

(71) Applicant: SAMSUNG DISPLAY CO., LTD., Yongin, Gyeonggi-Do (KR)

(72) Inventors: Min-Cheol Kim, Yongin (KR); In-Hwan Kim, Yongin (KR); An-Su Lee, Yongin (KR); Byung-Geun Jun, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/548,228

(22) Filed: Nov. 19, 2014

(65) Prior Publication Data

US 2015/0146017 A1     May 28, 2015

(30) Foreign Application Priority Data

Nov. 22, 2013   (KR) .......................... 10-2013-0142652

(51) Int. Cl.
*H04N 17/00* (2006.01)
*H04N 17/04* (2006.01)
*H04N 5/57* (2006.01)
*H04N 21/431* (2011.01)

(52) U.S. Cl.
CPC ................. *H04N 17/04* (2013.01); *H04N 5/57* (2013.01); *H04N 21/4318* (2013.01)

(58) Field of Classification Search
CPC ..... H04N 17/004; H04N 17/00; H04N 17/04; H04N 17/002; H04N 17/02; H04N 21/4318; H04N 5/57; G09G 2360/16; G09G 2320/0626
USPC .......... 348/189, 191, 192, 687, 658; 345/589, 345/690, 694
IPC ............................... H04N 17/00,5/57
See application file for complete search history.

(56) References Cited

U.S. PATENT DOCUMENTS

| | | | | |
|---|---|---|---|---|
| 8,786,712 B1 * | 7/2014 | Murase | .................. | G09G 3/006 348/189 |
| 2012/0154460 A1 * | 6/2012 | Segawa | ................ | G09G 3/3233 345/690 |
| 2013/0177242 A1 | 7/2013 | Adams, Jr. et al. | | |

FOREIGN PATENT DOCUMENTS

| | | |
|---|---|---|
| JP | 2004-301787 A | 10/2004 |
| KR | 1999-0049937 A | 7/1999 |

OTHER PUBLICATIONS

Korean Patent Abstract for KR 10-0257743 B1, which corresponds to KR Publ. No. 1999-0049937 A, published Jul. 5, 1999, 1 page.

*Primary Examiner* — Sherrie Hsia
(74) *Attorney, Agent, or Firm* — Lewis Roca Rothgerber Christie LLP

(57) ABSTRACT

Luminance correction systems and methods capable of reducing or removing luminance mura of display devices are provided. One luminance correction system includes: a display device including a plurality of pixels, the pixels including a plurality of sub-pixels, each of the pixels comprising at least two of the sub-pixels; an image capturing unit including a plurality of charge-coupled device (CCD) image capturing elements, an n×n arrangement of the image capturing elements corresponding to m of the pixels, n and m being natural numbers greater than or equal to 2; and a luminance correction device configured to generate a representative luminance value with respect to the m of the pixels based on luminance values measured by the n×n arrangement of the image capturing elements, and calculate a correction value with respect to the m of the pixels according to a difference between the representative luminance value and a target luminance value.

15 Claims, 5 Drawing Sheets

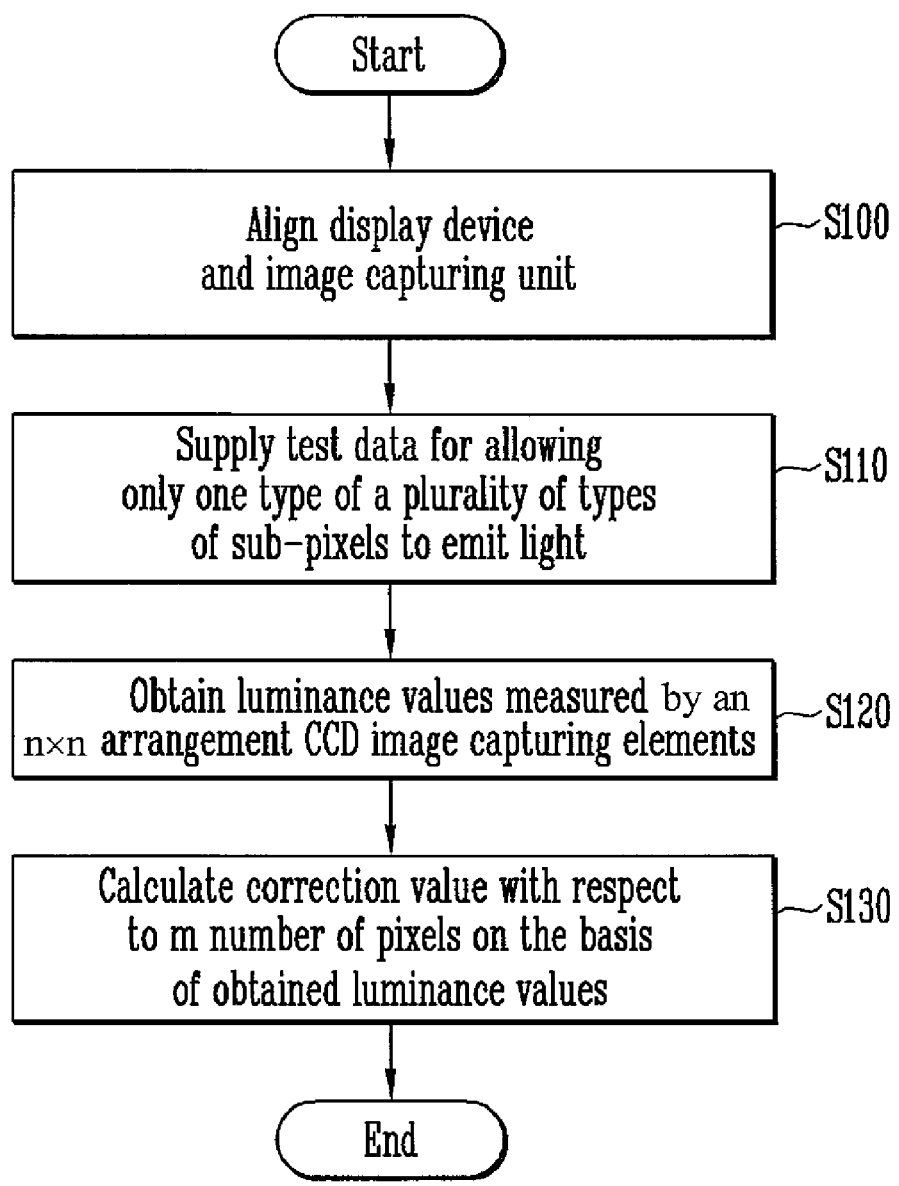

LUMINANCE CORRECTION SYSTEM AND METHOD

CROSS-REFERENCE TO RELATED APPLICATION

This application claims priority to and the benefit of Korean Patent Application No. 10-2013-0142652, filed on Nov. 22, 2013 in the Korean Intellectual Property Office, the entire content of which is incorporated herein by reference.

BACKGROUND

1. Field

Aspects of embodiments of the present invention relate to a luminance correction system and method.

2. Description of the Related Art

Recently, various flat panel display devices having reduced weight and volume compared to those of cathode ray tube (CRT) devices have been developed. Flat panel display devices include liquid crystal display (LCD) devices, field emission display (FED) devices, plasma display panels (PDPs), organic light emitting display devices, and the like. Among the flat panel display devices, organic light emitting display devices display images by using organic light emitting diodes (OLEDs) that generate light based on electron-hole recombination. Such display devices have fast response times and low power consumption.

Flat panel display devices may have brightness or luminance variations between different pixels due to characteristics such as variations in the pixels, variations in the manufacturing processes, and the like. Such brightness variations between pixels may generate luminance mura (e.g., unevenness, irregularity, lack of uniformity, nonuniformity, inequality) in flat panel display devices and degrade image quality.

SUMMARY

Embodiments of the present invention are directed toward luminance correction systems and methods capable of reducing or removing luminance mura of display devices. Further embodiments are directed to luminance correction systems and methods that reduce optical compensation process time (e.g., to better match or be less than takt time) for reducing or removing luminance mura.

According to an embodiment of the present invention, a luminance correction system is provided. The luminance correction system includes: a display device including a plurality of pixels, the pixels including a plurality of sub-pixels, each of the pixels including at least two of the sub-pixels; an image capturing unit including a plurality of charge-coupled device (CCD) image capturing elements, an n×n arrangement of the image capturing elements corresponding to m of the pixels, n and m being natural numbers greater than or equal to 2; and a luminance correction device configured to generate a representative luminance value with respect to the m of the pixels based on luminance values measured by the n×n arrangement of the image capturing elements, and calculate a correction value with respect to the m of the pixels according to a difference between the representative luminance value and a target luminance value.

The luminance correction device may include an alignment controller configured to control a position of the display device with respect to the image capturing unit such that the n×n arrangement of the image capturing elements are aligned with the m of the pixels, a test data supply unit configured to supply test data for allowing only one type of a plurality of types of the sub-pixels to emit light; and a correction unit configured to generate the representative luminance value with respect to the m of the pixels that emit light in response to the test data, and calculate the correction value corresponding to the representative luminance value.

The correction unit may include a weighting matrix generating unit configured to generate a weighting matrix corresponding to the one type, a multiplying unit configured to generate a second luminance matrix by multiplying a first luminance matrix including the luminance values by the weighting matrix, an averaging unit configured to generate the representative luminance value by calculating an average value of elements of the second luminance matrix, and a correction value generating unit configured to generate the correction value.

The weighting matrix generating unit may be further configured to generate the weighting matrix according to an arrangement of the one type of the sub-pixels in the m of the pixels.

The weighting matrix may be an asymmetrical Gaussian matrix.

The display device may further include a memory. The luminance correction device may be further configured to write correction data including the correction value to the memory.

The display device may be configured to correct image data supplied from the outside based on the correction data stored in the memory, and emit light according to the corrected image data.

The luminance correction device or the display device may be further configured to calculate correction values with respect to an entire gray scale through interpolation calculations using a first reference correction value calculated when first test data corresponding to a first reference gray level is supplied and a second reference correction value calculated when second test data corresponding to a second reference gray level is supplied.

According to another embodiment of the present invention, a luminance correction method is provided. The method includes: aligning an n×n arrangement of charge-coupled device (CCD) image capturing elements to correspond to m pixels, n and m being natural numbers greater than or equal to 2; supplying test data for allowing only one type of a plurality of types of sub-pixels constituting the m pixels to emit light; obtaining luminance values measured by the n×n arrangement of CCD image capturing elements; and calculating a correction value with respect to the m pixels based on the luminance values.

The calculating of the correction value may include generating a representative luminance value with respect to the m pixels based on the luminance values, and calculating the correction value according to a difference between the representative luminance value and a target luminance value.

The generating of the representative luminance value may include generating a weighting matrix corresponding to the one type, multiplying a first luminance matrix including the luminance values by the weighting matrix to generate a second luminance matrix, and calculating an average value of elements of the second luminance matrix to generate the representative luminance value.

The generating of the weighting matrix may include generating of the weighting matrix according to an arrangement of the one type of the sub-pixels.

The weighting matrix may be an asymmetrical Gaussian matrix.

The luminance correction method may further include writing correction data including the correction value to a memory of a display device.

The calculating of the correction value may include calculating correction values with respect to an entire gray scale through interpolation calculations using a first reference correction value calculated when first test data corresponding to a first reference gray level is supplied and a second reference correction value calculated when second test data corresponding to a second reference gray level is supplied.

BRIEF DESCRIPTION OF THE DRAWINGS

Example embodiments will now be described more fully hereinafter with reference to the accompanying drawings; however, the present invention may be embodied in different forms and should not be construed as limited to the embodiments set forth herein. Rather, these embodiments are provided to more fully convey the scope of the present invention to those skilled in the art.

In the drawings, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 7 is a flow chart illustrating a luminance correction method according to an embodiment of the present invention.

DETAILED DESCRIPTION

Hereinafter, embodiments of the present invention will be described in detail with reference to the accompanying drawings.

Figure 1:
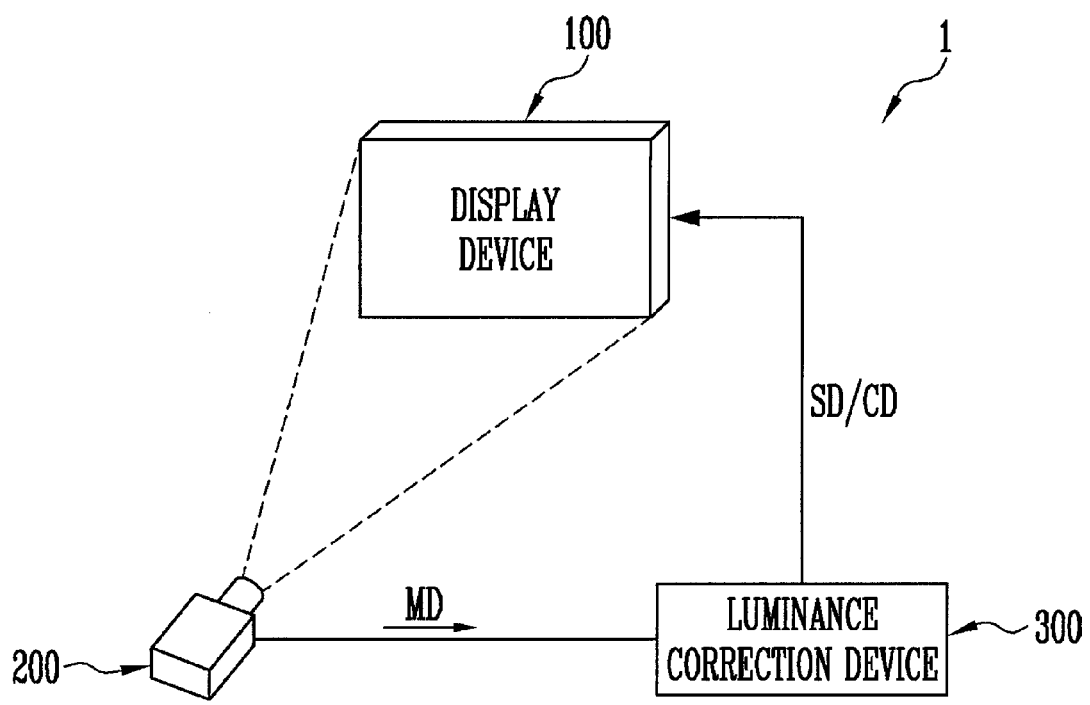
FIG. 1 is a conceptual view illustrating a luminance correction system according to an embodiment of the present invention.
Figure 2:
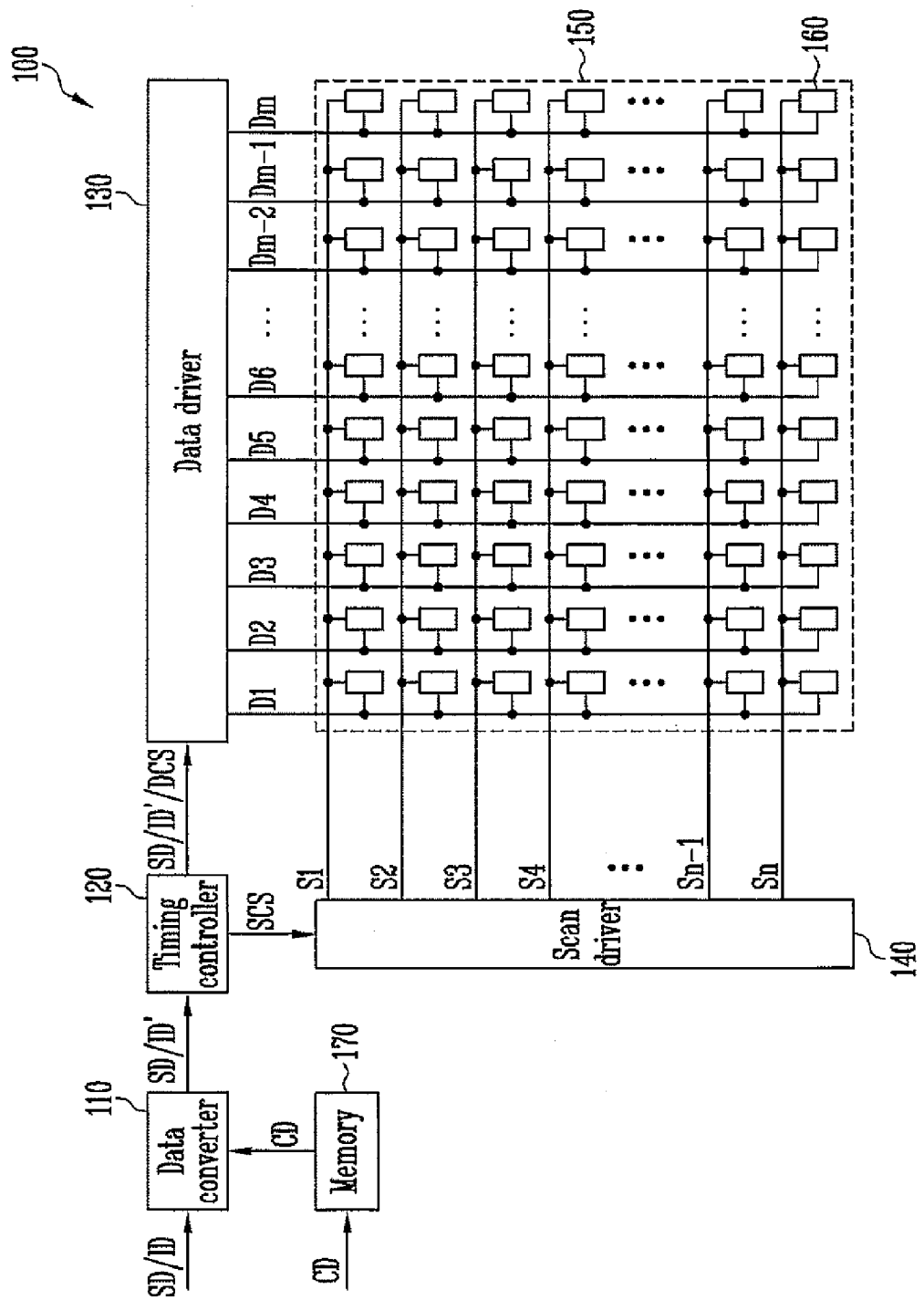
FIG. 2 is a block diagram illustrating a display device of FIG. 1.
Figure 3:
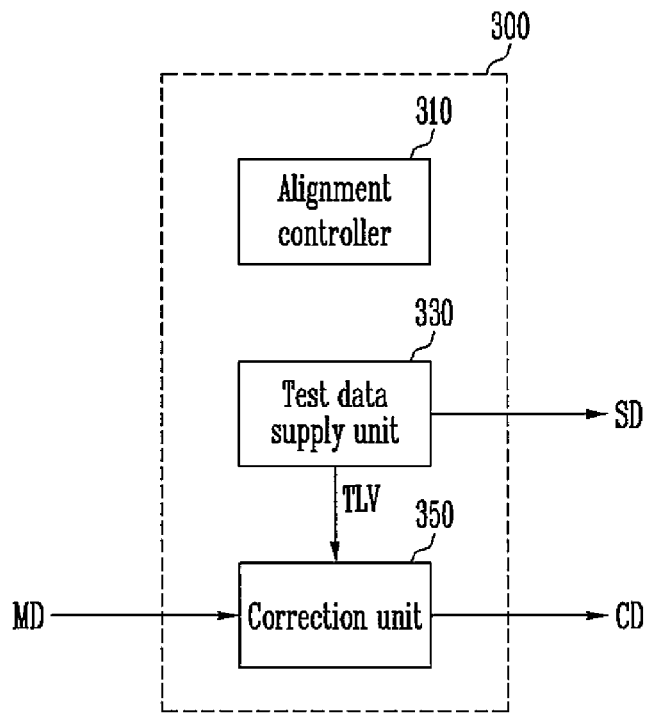
FIG. 3 is a block diagram illustrating a luminance correction device of FIG. 1.
Figure 4:
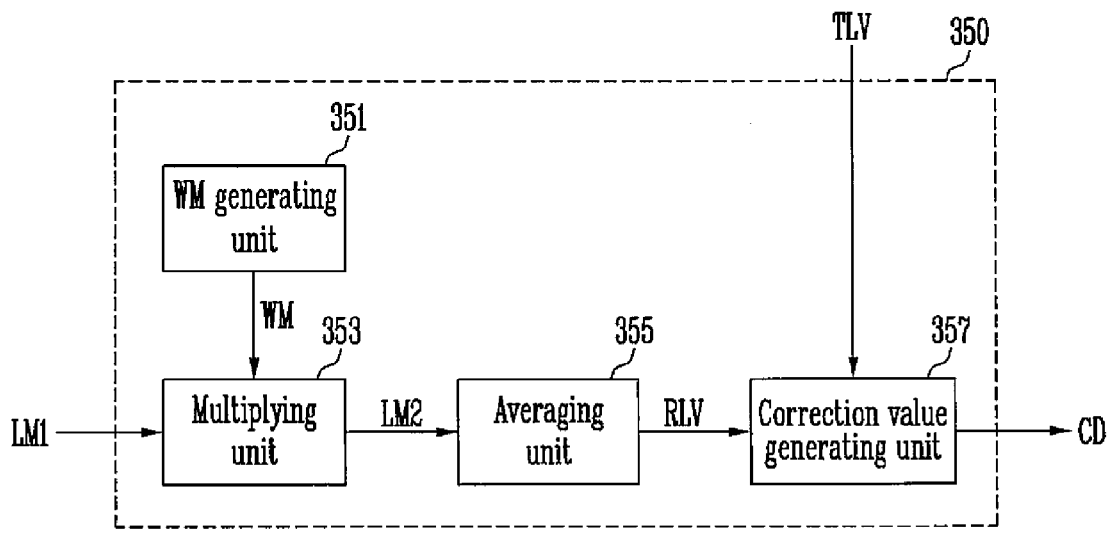
FIG. 4 is a block diagram illustrating a correction unit of FIG. 3.
Figure 5:
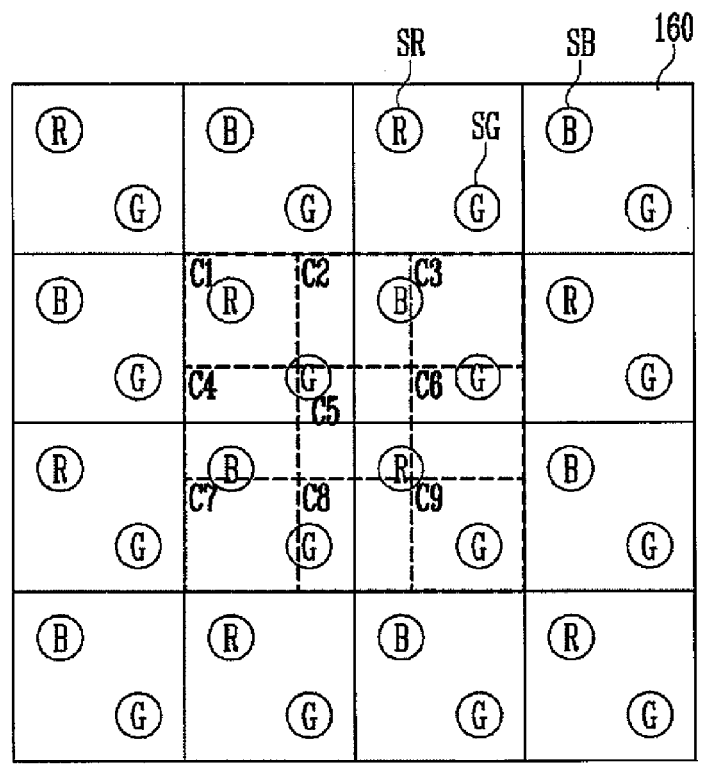
FIG. 5 is an illustration of corresponding relationships between pixels of the display device and charge coupled device (CCD) image capturing elements of an image capturing unit according to an embodiment of the present invention.
Figure 6:
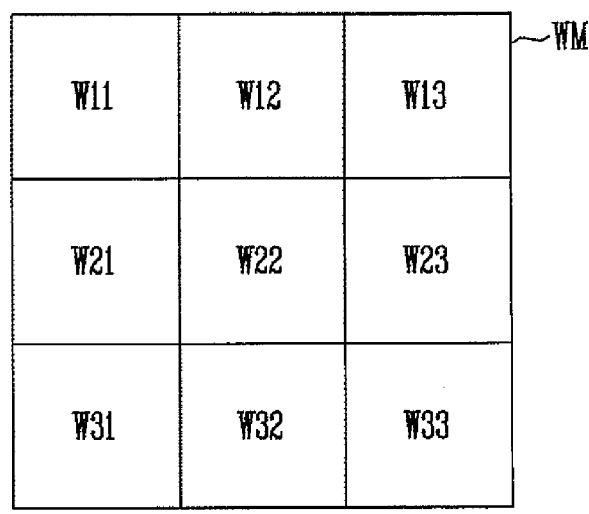
FIG. 6 is an illustration of an example weighting matrix according to an embodiment of the present invention.

FIG. 1 is a conceptual view illustrating a luminance correction system 1 according to an embodiment of the present invention, FIG. 2 is a block diagram illustrating a display device 100 of FIG. 1, FIG. 3 is a block diagram illustrating a luminance correction device 300 of FIG. 1, FIG. 4 is a block diagram illustrating a correction unit 350 of FIG. 3, FIG. 5 is an illustration of corresponding relationships between pixels 160 of a display device and CCD image capturing elements C1-C9 of an image capturing unit 200 according to an embodiment of the present invention, and FIG. 6 is an illustration of an example weighting matrix WM according to an embodiment of the present invention.

In FIGS. 5 and 6, 3×3 arrangements of CCD image capturing elements are depicted corresponding to 2×2 arrangements of pixels of a display device for purposes of illustration. However, the present invention is not limited thereto. For example, in other embodiments, arrangements of n×n CCD image capturing elements corresponding to arrangements of m pixels (where n and m are natural numbers greater than or equal to 2) may be used to perform luminance correction processes.

Referring to FIGS. 1 through 6 in general, and specifically now to FIG. 1, the luminance correction system 1 includes the display device 100, the image capturing unit 200, and the luminance correction device 300. Referring also now to FIG. 2, the display device 100 displays an image in response to test data SD supplied from the luminance correction device 300 or image data ID supplied from the outside. The display device 100 stores correction data (or compensation data) CD supplied from the luminance correction device 300 in a memory 170. The display device 100 converts the image data ID into corrected image data ID' based on the correction data CD stored in the memory 170 and displays an image corresponding to the corrected image data ID'.

The display device 100 includes a data converter 110, a timing controller 120, a data driver 130, a scan driver 140, and a display unit 150. The data converter 110 converts the image data ID (supplied from the outside) according to the correction data CD stored in the memory 170 and supplies the corrected image data ID' to the timing controller 120. The data converter 110 may also pass the test data SD unchanged from the luminance correction device 300 to the timing controller 120.

The timing controller 120 controls an operation of the data driver 130 and the scan driver 140 in response to a synchronization signal supplied from the outside. In further detail, the timing controller 120 generates a data driving control signal DCS and supplies the data driving control signal DCS to the data driver 130. The timing controller 120 also generates a scan driving control signal SCS and supplies the scan driving control signal SCS to the scan driver 140. In addition, the timing controller 120 supplies the test data SD supplied from the luminance correction device 300 or the corrected image data ID' supplied from the data converter 110 to the data driver 130 in synchronization with the data driving control signal DCS and the scan driving control signal SCS.

In response to the data driving control signal DCS output from the timing controller 120, the data driver 130 realigns the test data SD or the corrected image data ID' and supplies the realigned data as data signals to data lines D1 to Dm. In response to the scan driving control signal SCS, the scan driver 140 sequentially supplies a scan signal to scan lines S1 to Sn.

The display unit 150 includes pixels 160 disposed at crossing regions of the data lines D1 to Dm and the scan lines S1 to Sn. Here, the data lines D1 to Dm are arranged in a vertical direction, and the scan lines S1 to Sn are arranged in a horizontal direction. The pixels 160 are connected to corresponding data lines among the data lines D1 to Dm and corresponding scan lines among the scan lines S1 to Sn. The display unit 150 also includes sub-pixels (such as red sub-pixels SR, green sub-pixels SG, and blue sub-pixels SB, as illustrated in FIG. 5). Each of the pixels 160 includes a plurality of such sub-pixels (such as a red sub-pixel SR and a green sub-pixel SG, or a blue sub-pixel SB and a green sub-pixel SG, as illustrated in FIG. 5, but the present invention is not limited thereto).

The image capturing unit 200 captures a portion of an image displayed on the display device 100. In further detail, the image capturing unit 200 measures luminance of the pixels 160. The image capturing unit 200 may be implemented as a charged coupled device (CCD) camera. The image capturing unit 200 may include a plurality of CCD image capturing elements (such as CCD image capturing elements C1 to C9 in FIG. 5). Each of the plurality of CCD image capturing elements generates a luminance value in response to pixels 160 that emit light. The image capturing unit 200 generates measurement data MD including measured luminance values. The image capturing unit 200 supplies the generated measurement data MD to the luminance correction device 300.

The luminance correction device 300 aligns the display device 100 and the image capturing unit 200. In further detail, the luminance correction device 300 aligns or otherwise controls a position of the display device 100 with respect to the image capturing unit 200 such that an n×n arrangement of CCD image capturing elements corresponds to an arrangement of m pixels 160 (where n and m are natural numbers greater than or equal to 2). For example, as illustrated in FIG. 5, the luminance correction device 300 controls a position of the display device 100 with respect to the image capturing unit 200 such that a 3×3 arrangement of CCD image capturing elements C1 to C9 corresponds to a 2×2 arrangement of pixels 160.

m may represent, for example, the number of pixels in the smallest arrangement of pixels P that generates the pattern of sub-pixels that make up the display unit 150. For example, in the sub-pixel and pixel arrangement of FIG. 5, a 2×2 square of pixels P is needed to generate the pattern of red sub-pixels SR, green sub-pixels SG, and blue sub-pixels SB, so m is 4 in this example.

After the display device 100 and the image capturing unit 200 are aligned, the luminance correction device 300 supplies the test data SD to the display device 100 and generates the correction data CD based on the measurement data MD supplied from the image capturing unit 200 obtained when the display device 100 displayed the test data SD. In further detail, the luminance correction device 300 generates a representative luminance value RLV with respect to an arrangement of m pixels 160 based on luminance values measured by the n×n arrangement of CCD image capturing elements, and calculates a correction value with respect to the m pixels according to a difference between the generated representative luminance value RLV and a target luminance value TLV. The luminance correction device 300 writes the correction data CD including the calculated correction values to the memory 170 of the display device 100.

Referring now to FIG. 3, the luminance correction device 300 includes a alignment controller 310, a test data supply unit 330, and a correction unit 350. The alignment controller 310 controls a position of the display device 100 with respect to the image capturing unit 200 such that the n×n arrangement of image capturing elements correspond to the arrangement of m pixels 160.

The test data supply unit 330 generates test data SD for allowing only one type of sub-pixel, namely, a measurement target type of sub-pixel (such as red sub-pixels), among a plurality of types of sub-pixels (such as red, green, and blue sub-pixels), to emit light, and supplies the generated test data SD to drive sub-pixels of the target type in the display device 100. For example, the test data supply unit 330 may generate test data SD for driving the red sub-pixels in the display device 100.

In addition, the test data supply unit 330 generates the target luminance value TLV corresponding to a reference gray level included in the test data SD. Here, the target luminance value TLV refers to a luminance value for each of the pixels 160 to emit light in response to gray levels included in the test data SD, as measured by the n×n arrangement of image capturing elements. The test data supply unit 330 supplies the generated target luminance value TLV to the correction unit 350.

The correction unit 350 calculates correction values corresponding to respective pixels 160 based on the measurement data MD supplied from the image capturing unit 200 and the target luminance value TLV supplied from the test data supply unit 330. In further detail, the correction unit 350 generates the representative luminance value RLV with respect to the m pixels emitting light in response to the test data SD (as measured by the n×n arrangement of image capturing elements), and calculates correction values with respect to the m pixels based on the generated representative luminance value RLV. The correction unit 350 supplies the correction data CD including the calculated correction values to the display device 100.

Referring now to FIG. 4, the correction unit 350 includes a weighting matrix generating unit 351, a multiplying unit 353, an averaging unit 355, and a correction value generating unit 357. The weighting matrix generating unit 351 generates a weighting matrix WM corresponding to a type of sub-pixel, namely, a measurement target type of sub-pixel, that emits light in response to the test data SD. Values of respective elements of the weighting matrix WM are determined according to an arrangement of the sub-pixels. For example, each of the elements of the weighting matrix WM may be determined to cancel noise caused by adjacent measurement target sub-pixels according to a distance between measurement target sub-pixels.

For example, referring to FIG. 5, when the measurement target type of sub-pixel is red sub-pixels SR or blue sub-pixels SB, the CCD image capturing elements C1 to C9 measure luminance of red sub-pixels SR or blue sub-pixels SB of adjacent pixels 160, as well as luminance of the red sub-pixels SR or blue sub-pixels SB of the m corresponding pixels (i.e., corresponding to the n×n arrangement of image capturing elements). The luminance of the red sub-pixels SR or the blue sub-pixels SB of adjacent pixels 160 is noise, so it should be canceled.

Accordingly, when sub-pixels are arranged as illustrated in FIG. 5, the red sub-pixels SR and the blue sub-pixels SB are provided in upper left portions of each of the pixels 160, so the upper left elements (e.g., W11, W12, and W21) of the weighting matrix WM are set to relatively high values, and the lower right elements (e.g., W23, W32, and W33) are set to relatively low values. In addition, the central element W22 is set to the highest value. Thus, the elements of the weighting matrix WM are set in relationship to (such as in proportion to) the amount of luminance (for the measurement target type of sub-pixel) contributed by sub-pixels of that type in the m corresponding pixels 160, and in inverse relationship to the amount of noise contributed by sub-pixels of that type in adjacent pixels 160.

For example, for the (two) red sub-pixels SR in the 2×2 central portion of pixels 160 in FIG. 5, the upper left and central image capturing elements C1 and C5, respectively, receive the most amount of red light from these two red sub-pixels SR (and the least amount of noise from red sub-pixels SR of adjacent pixels 160). On the other hand, the upper right and lower left image capturing elements C3 and C7, respectively, receive the least amount of red light from the two red sub-pixels SR in the 2×2 central portion of pixels 160 (and the most amount of noise from red sub-pixels SR of adjacent pixels 160). Accordingly, for the red sub-pixels, corresponding weighting matrix WM elements W11 and W22 receive the largest values while elements W13 and W31 receive the smallest values.

Likewise, when a measurement target type of sub-pixel is green sub-pixels SG, the CCD image capturing elements C1 to C9 measure luminance of a green sub-pixel SG of adjacent pixels, as well as luminance of the green sub-pixel SG of the corresponding pixels. The luminance of the green sub-pixels SG of adjacent pixels 160 is noise, so it should be canceled. Unlike the red sub-pixels SR and blue sub-pixels SB, however, when the sub-pixels are arranged as illustrated in FIG. 5, the green sub-pixels SG are provided in lower right portions of each of the pixels 160, so the lower right elements (e.g., W23, W32, and W33) of the weighting matrix WM are set to relatively high values, and upper left elements (e.g., W11, W12, and W21) are set to relatively low values. In addition, the central element W22 has the highest value.

Each of the elements of the weighting matrix WM is set according to the expected contribution of the measured luminance value from the sub-pixels (in the m pixels 160) of the target type of sub-pixel being tested and measured. When the sub-pixels SR, SG, and SB are arranged as illustrated in FIG. 5, the weighting matrix WM for each of the different types of sub-pixel may be an asymmetrical Gaussian matrix.

The multiplying unit 353 multiplies a first luminance matrix LM1 (n×n) including the luminance values (as measured by the n×n arrangement of CCD image capturing elements) by the weighting matrix WM (also n×n) to generate a second luminance matrix LM2 (also n×n). The averaging unit 355 calculates an average value of the $n^2$ elements of the second luminance matrix LM2 and outputs the calculated average value as the representative luminance RLV.

The correction value generating unit 357 generates the correction data CD based on the representative luminance value RLV supplied from the averaging unit 355 and the target luminance value TLV supplied from the test data supply unit 330. In further detail, the correction value generating unit 357 generates a correction value (or compensation value) corresponding to the m pixels and the target type of sub-pixel being measured according to a difference between the representative luminance value RLV and the target luminance value TLV, and generates the correction data CD including the generated correction value. The correction value generating unit 357 supplies the generated correction data CD to the display device 100, such as storing it in the memory 170.

The process is repeated for each group of m pixels 160 and each of the different types of sub-pixels (e.g., once for each of the red, green, and blue sub-pixels). The process may also be repeated within each group of m pixels 160 for the same type of sub-pixels, for example, to obtain more accurate correction data CD. For example, the luminance correction device 300 or data converter 110 may calculate correction values with respect to an entire gray scale through interpolation calculations using a first reference correction value calculated when first test data corresponding to a first reference gray level (such as a brightest gray level) is supplied and a second reference correction value calculated when second test data corresponding to a second reference gray level (such as half the brightest gray level) is supplied.

The correction data CD causes the data converter to convert the image data ID to corrected image data ID' that compensates each of the sub-pixels corresponding to discrepancies of their representative luminance values RLV and their target luminance values TLV.

FIG. 7 is a flow chart illustrating a luminance correction method according to an embodiment of the present invention.

Referring to FIG. 7, the luminance correction device 300 aligns the display device 100 and the image capturing unit 200 such that an n×n arrangement of CCD image capturing elements correspond to m pixels 160 (S100). After the display device 100 and the image capturing unit 200 are aligned, the luminance correction device 300 generates test data SD for allowing only a measurement target type of sub-pixel, among a plurality of types of sub-pixels SR, SG, and SB, to emit light, and supplies the generated test data SD to the display device 100 (S110).

The display device 100 emits light in response to the test data SD. In this case, the image capturing unit 200 measures luminance of the m pixels 160 by using the n×n arrangement of CCD image capturing elements. The image capturing unit 200 supplies measurement data MD including luminance values corresponding to the n×n arrangement of CCD image capturing elements to the luminance correction device 300. The luminance correction device 300 obtains the luminance values from the measurement data MD (S120).

The luminance correction device 300 calculates a correction value with respect to the m pixels 160 based on the obtained luminance values, and supplies correction data CD including the calculated correction value to the display device 100 (S130). In further detail, the luminance correction device 300 generates a second luminance matrix LM2 by multiplying a first luminance matrix LM1 including the obtained luminance values by a weighting matrix WM. The luminance correction device 300 calculates a correction value corresponding to a difference between a representative luminance value RLV (e.g., an average value) of the elements of the second luminance matrix LM2 and a target luminance value TLV.

The display device 100 converts image data ID supplied from the outside thereafter into corrected image data ID' based on the correction data CD, and emits light in response to the corrected image data ID'. In this manner, the luminance correction system and method according to an embodiment of the present invention may shorten a time required for optical compensation.

By way of summation and review, general flat panel display devices including organic light emitting display devices may have brightness or luminance variations generated between respective pixels due to characteristics variations of pixels, variations in manufacturing processes, and the like. Such brightness variations between pixels may generate luminance mura (e.g., unevenness, irregularity, lack of uniformity, nonuniformity, inequality) in flat panel display devices and degrade image quality.

By comparison, luminance correction systems and methods according to embodiments of the present invention may reduce or eliminate luminance mura of flat panel display devices. In particular, these luminance correction systems and methods may reduce optical compensation process time for removing luminance mura, allowing, for example, the optical compensation process to fit within the takt time allocated to it.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims and their equivalents.

What is claimed is:

1. A luminance correction system comprising:
a display device comprising a plurality of pixels, the pixels comprising a plurality of sub-pixels, each of the pixels comprising at least two of the sub-pixels;
an image capturing unit comprising a plurality of charge-coupled device (CCD) image capturing elements, an n×n arrangement of the image capturing elements corresponding to m of the pixels, n and m being natural numbers greater than or equal to 2; and
a luminance correction device configured to:
generate a representative luminance value with respect to the m of the pixels based on luminance values measured by the n×n arrangement of the image capturing elements; and
calculate a correction value with respect to the m of the pixels according to a difference between the representative luminance value and a target luminance value.

2. The luminance correction system as claimed in claim 1, wherein the luminance correction device comprises:
an alignment controller configured to control a position of the display device with respect to the image capturing unit such that the n×n arrangement of the image capturing elements are aligned with the m of the pixels;
a test data supply unit configured to supply test data for allowing only one type of a plurality of types of the sub-pixels to emit light; and
a correction unit configured to:
generate the representative luminance value with respect to the tin of the pixels that emit light in response to the test data; and
calculate the correction value corresponding to the representative luminance value.

3. The luminance correction system as claimed in claim 2, wherein the correction unit comprises:
a weighting matrix generating unit configured to generate a weighting matrix corresponding to the one type;
a multiplying unit configured to generate a second luminance matrix by multiplying a first luminance matrix comprising the luminance values by the weighting matrix;
an averaging unit configured to generate the representative luminance value by calculating an average value of elements of the second luminance matrix; and
a correction value generating unit configured to generate the correction value.

4. The luminance correction system as claimed in claim 3, wherein the weighting matrix generating unit is further configured to generate the weighting matrix according to an arrangement of the one type of the sub-pixels in the m of the pixels.

5. The luminance correction system as claimed in claim 3, wherein the weighting matrix is an asymmetrical Gaussian matrix.

6. The luminance correction system as claimed in claim 1, wherein
the display device further comprises a memory, and
the luminance correction device is further configured to write correction data comprising the correction value to the memory.

7. The luminance correction system as claimed in claim 6, wherein the display device is configured to:
correct image data supplied from the outside based on the correction data stored in the memory; and
emit light according to the corrected image data.

8. The luminance correction system as claimed in claim 1, wherein the luminance correction device or the display device is further configured to calculate correction values with respect to an entire gray scale through interpolation calculations using a first reference correction value calculated when first test data corresponding to a first reference gray level is supplied and a second reference correction value calculated when second test data corresponding to a second reference gray level is supplied.

9. A luminance correction method comprising:
aligning an n×n arrangement of charge-coupled device (CCD) image capturing elements to correspond to m pixels, n and m being natural numbers greater than or equal to 2;
supplying test data for allowing only one type of a plurality of types of sub-pixels constituting the m pixels to emit light;
obtaining luminance values measured by the n×n arrangement of CCD image capturing elements; and
calculating a correction value with respect to the m pixels based on the luminance values.

10. The luminance correction method as claimed in claim 9, wherein the calculating of the correction value comprises:
generating a representative luminance value with respect to the m pixels based on the luminance values; and
calculating the correction value according to a difference between the representative luminance value and a target luminance value.

11. The luminance correction method as claimed in claim 10, wherein the generating of the representative luminance value comprises:
generating a weighting matrix corresponding to the one type;
multiplying a first luminance matrix comprising the luminance values by the weighting matrix to generate a second luminance matrix; and
calculating an average value of elements of the second luminance matrix to generate the representative luminance value.

12. The luminance correction method as claimed in claim 11, wherein the generating of the weighting matrix comprises generating of the weighting matrix according to an arrangement of the one type of the sub-pixels.

13. The luminance correction method as claimed in claim 11, wherein the weighting matrix is an asymmetrical Gaussian matrix.

14. The luminance correction method as claimed in claim 9, further comprising writing correction data comprising the correction value to a memory of a display device.

15. The luminance correction method as claimed in claim 9, wherein the calculating of the correction value comprises calculating correction values with respect to an entire gray scale through interpolation calculations using a first reference correction value calculated when first test data corresponding to a first reference gray level is supplied and a second reference correction value calculated when second test data corresponding to a second reference gray level is supplied.

* * * * *